United States Patent
Bruzek et al.

(10) Patent No.: US 8,712,490 B2
(45) Date of Patent: Apr. 29, 2014

(54) CONDUCTOR FOR TRANSMITTING ELECTRICAL POWER

(75) Inventors: Christian-Eric Bruzek, Thun St Martin (FR); Arnaud Allais, Limas (FR); Claus-Friedrich Theune, Wennigsen (DE)

(73) Assignee: Nexans, Paris (FR)

( * ) Notice: Subject to any disclaimer, the term of this patent is extended or adjusted under 35 U.S.C. 154(b) by 365 days.

(21) Appl. No.: 13/275,426

(22) Filed: Oct. 18, 2011

(65) Prior Publication Data

US 2012/0129701 A1    May 24, 2012

(30) Foreign Application Priority Data

Oct. 27, 2010  (FR) .................... 10 58844

(51) Int. Cl.
- *H01B 12/02* (2006.01)
- *H01B 12/00* (2006.01)
- *H01L 39/04* (2006.01)
- *H01B 5/00* (2006.01)

(52) U.S. Cl.
USPC ........... 505/232; 505/230; 505/430; 505/433; 174/125.1; 174/126.1; 29/599

(58) Field of Classification Search
USPC ......... 505/150, 230, 232, 236–238, 430, 433, 505/704; 174/125.1, 126.1, 15.5; 29/599
See application file for complete search history.

(56) References Cited

U.S. PATENT DOCUMENTS

| 3,781,982 A | * | 1/1974 | Ziemek et al. .................. 29/599 |
| 7,622,425 B2 | * | 11/2009 | Allais et al. .................... 505/236 |

FOREIGN PATENT DOCUMENTS

| FR | 1034895 |   | 8/1953 |   |
| GB | 1275985 |   | 6/1972 |   |
| JP | 04337213 | * | 11/1992 | ............ H01B 12/02 |
| JP | 4337213 |   | 9/2009 |   |

OTHER PUBLICATIONS

International Search Report dated Apr. 5, 2011.

\* cited by examiner

*Primary Examiner* — Stanley Silverman
*Assistant Examiner* — Kallambella Vijayakumar
(74) *Attorney, Agent, or Firm* — Sofer & Haroun, LLP

(57) ABSTRACT

A conductor for transmitting electrical power having a cylindrical core (1) clad with a strip of metallic material (2), possibly comprising a superconductor, placed, in the shape of a tube, longitudinally around said core (I), its longitudinal edges being welded to each other along a weld seam (3). The core (1) has a slot (4, 4') placed under said weld seam (3).

7 Claims, 1 Drawing Sheet

CONDUCTOR FOR TRANSMITTING ELECTRICAL POWER

RELATED APPLICATION

This application claims the benefit of priority from French. Patent Application No. 10 58844, filed on Oct. 27, 2010, the entirety of which is incorporated by reference.

BACKGROUND

1. Field of the Invention

The invention relates to a conductor for transmitting electrical power.

It relates more precisely to a conductor comprising a cylindrical core clad with a strip of metallic material, possibly comprising a superconductor, placed, in the shape of a tube, longitudinally around said core, its longitudinal edges being welded to each other along a weld seam.

2. Description of Related Art

For this type of conductor, the strip may consist of
- a conventional conductor, for example copper on an aluminum core;
- a nickel, nickel-alloy or steel substrate intended for deposition, after welding, of one or more ceramic layers comprising at least one superconductor layer;
- a metal substrate already coated with one or more nonsuperconducting ceramic layers intended for deposition, after welding of at least one superconductor layer; or
- a metal substrate already coated with a plurality of ceramic layers at least one of which is a superconductor layer.

For example, patent GB 1 275 985 describes such a conductor, comprising a cylindrical core coated with a strip comprising superconductors placed, in the shape of a tube, longitudinally around said core, its longitudinal edges being welded to each other along a weld seam.

This type of conductor is manufactured using a draw-down operation.

The strip of metallic material, possibly comprising a superconductor, is placed longitudinally about the core, its longitudinal edges being welded to each other along a weld seam preferably produced by laser welding or by gas-shielded arc welding, i.e. TIG (tungsten inert gas) welding, then drawn down around the core. This tube is drawn down over the core with an area reduction ranging between 10 and 15%. The strip is then pressed against the core.

Manufacture using draw-down after welding is necessary at the present time because, to carry out the welding, it is indispensible to have an empty space under the weld seam. This welding of the tube formed by the strip is therefore carried out on a diameter larger than the diameter of the final product, and then this tube is drawn down so as to he pressed against the cylindrical core,

OBJECTS AND SUMMARY

However, it has been shown that this draw-down operation degrades the mechanical, thermal and electrical properties or the tube of metallic material, possibly comprising a superconductor.

This draw-down operation may damage the orientation of surface grains and/or a layer of ceramic material with which it is coated.

The invention solves this problem by ensuring manufacture of such a conductor without the draw-down operation being required.

To do this, the invention provides a conductor for transmitting electrical power comprising a cylindrical core clad with a strip of metallic material, possibly comprising a superconductor, placed, in the shape of a tube, longitudinally around said core, its longitudinal edges being welded to each other along a weld seam, characterized in that said core has a slot placed under said weld seam.

According to a first preferred embodiment, said slot formed in said cylindrical core has a substantially semicircular cross section.

According to a second preferred embodiment, said slot is formed by means of a flat formed in said cylindrical core.

Said slot may have a depth lying between 0.1 and 0.2 mm.

Said strip may have a thickness lying between 20 and 150 microns.

Said welded tube formed by said strip may have an outside diameter of 0.5 to 3 mm.

BRIEF DESCRIPTION OF THE DRAWINGS

The invention is described by means of figures showing only preferred embodiments of the invention.

DETAILED DESCRIPTION OF THE DRAWINGS

As illustrated in the figures, a conductor for transmitting electrical power according to the invention comprises a cylindrical core 1, which may be solid as shown or a hollow tube, clad with a strip 2 of metallic material, possibly comprising a superconducting, placed, in the shape of a tube, longitudinally around the core 1, its longitudinal edges being welded to each other along a weld seam 3.

This core 1 has a slot 4, 4' placed under the weld seam.

Figure 1:
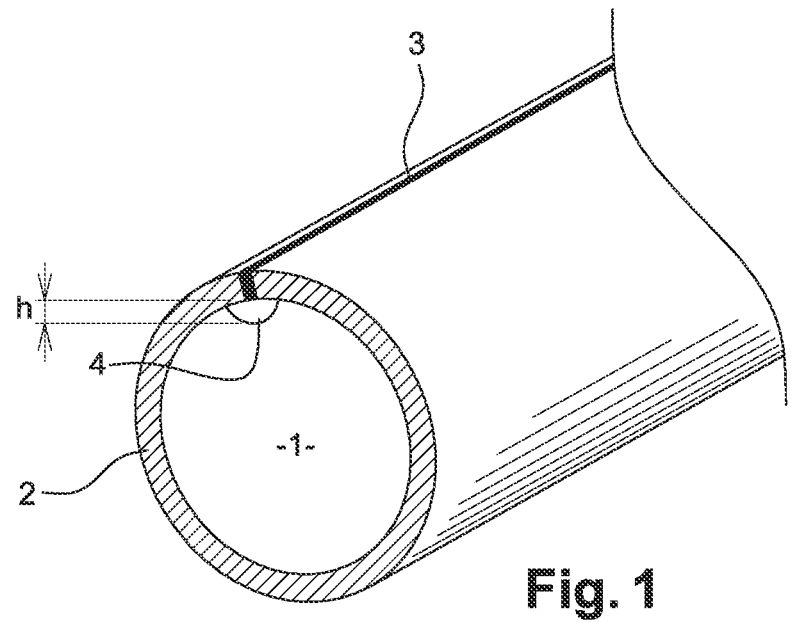
FIG. 1 is a view in cross section of a conductor according to the invention in a first embodiment.
Figure 2:
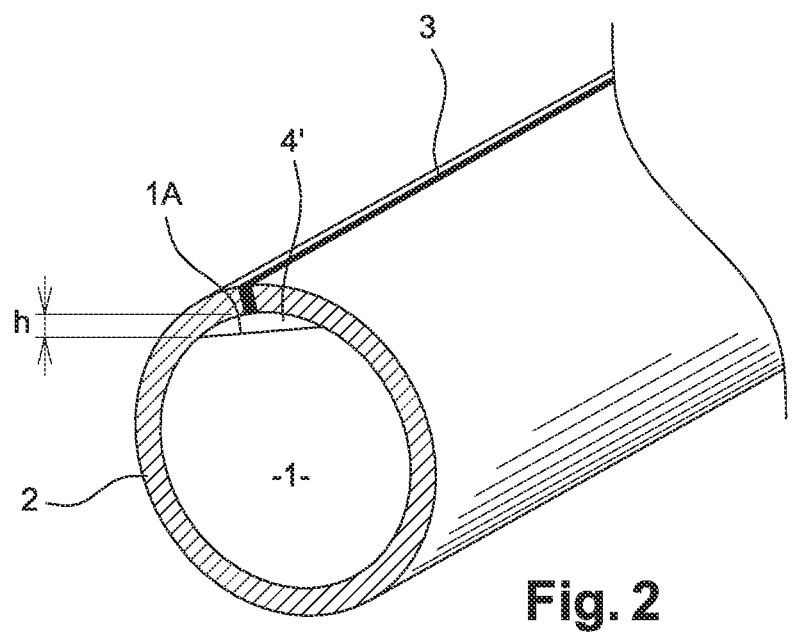
FIG. 2 is a view in cross section of a conductor according to the invention in a second embodiment.

In a first embodiment, shown in FIG. 1, the slot formed in the cylindrical core 1 has a substantially semicircular cross section.

In a second preferred embodiment, the slot 4' is formed by means of a flat 1A formed in the cylindrical core 1.

The slot 4, 4' preferably has a depth h lying between 0.1 and 0.2 mm, given that the strip of metallic material, possibly comprising a superconducting deposit 2, may have a thickness lying between 20 and 150 microns and that the welded tube formed by this strip may have an outside diameter of 0.5 to 3 mm.

The invention claimed is:

1. Conductor for transmitting electrical power comprising: a cylindrical core clad with a strip of metallic material, its longitudinal edges being welded to each other along a weld seam, wherein said core has a slot placed under said weld seam.

2. Conductor according to claim 1, wherein said slot formed in said cylindrical core has a substantially semicircular cross section.

3. Conductor according to claim 1, wherein said slot is formed by means of a flat formed in said cylindrical core.

4. Conductor according to claim 1, wherein said slot has a depth (h) lying between 0.1 and 0.2 mm.

5. Conductor according to claim 1, wherein said strip has a thickness lying between 20 and 150 microns.

6. Conductor according to claim 1, wherein said welded tube formed by said strip has an outside diameter of 0.5 to 3 mm.

7. Conductor according to claim 1, further comprising a superconductor placed, in the shape of a tube, longitudinally around said core.

\* \* \* \* \*